June 14, 1938.  I. COWLES  2,120,275
DETACHABLE HOSE COUPLING
Filed Sept. 16, 1936  2 Sheets-Sheet 1
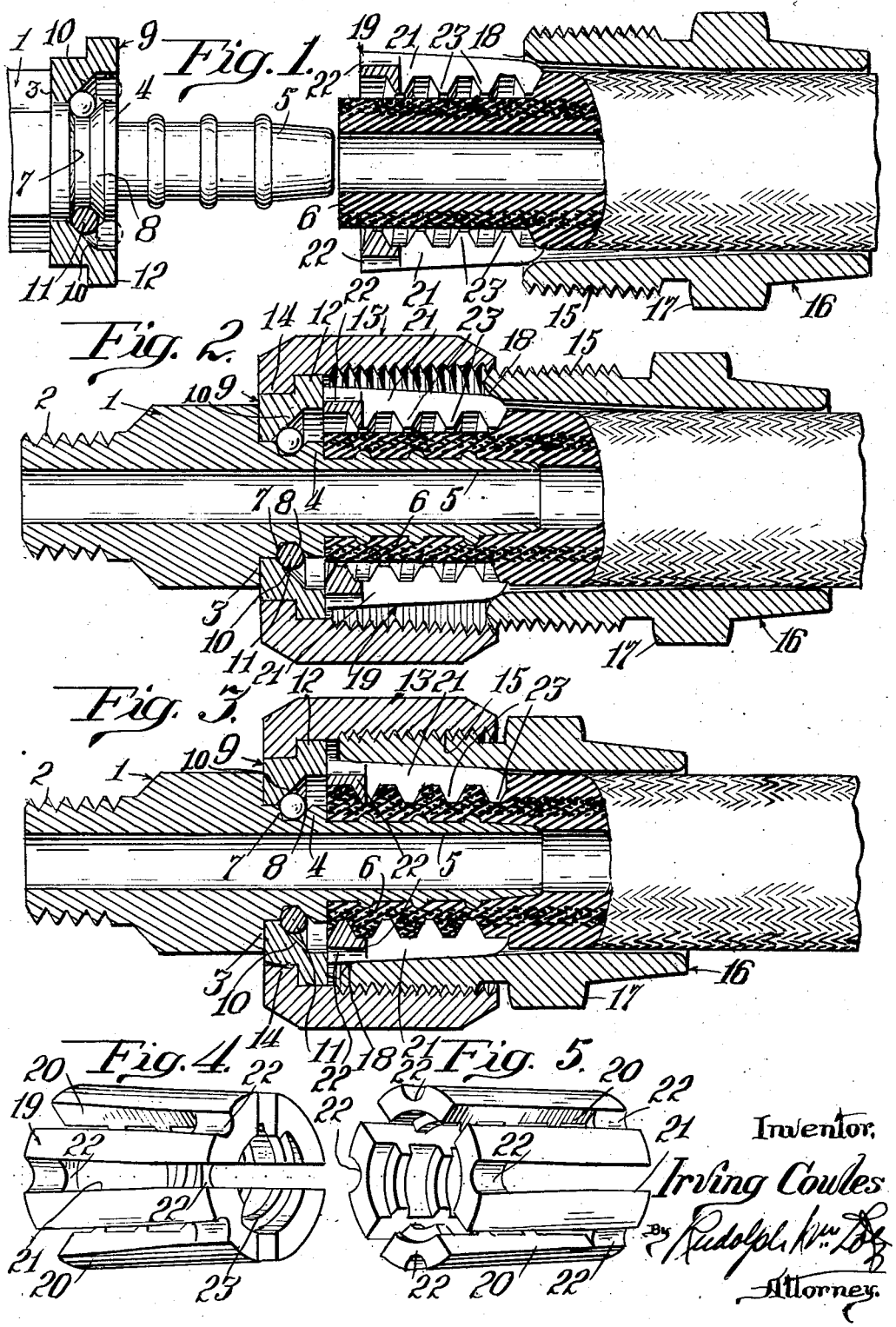

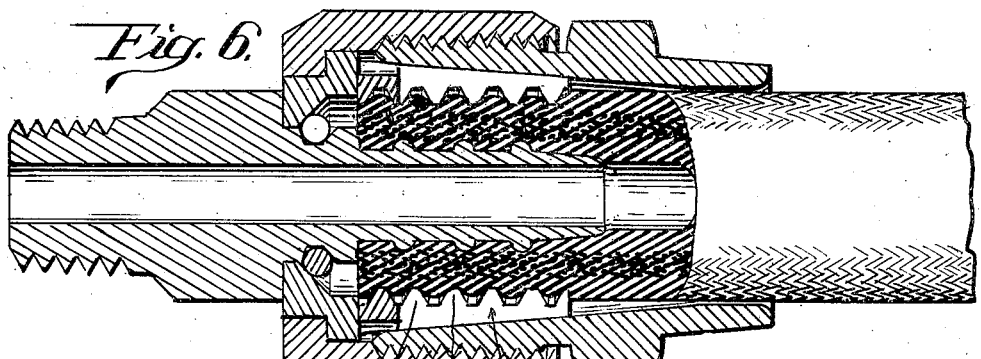
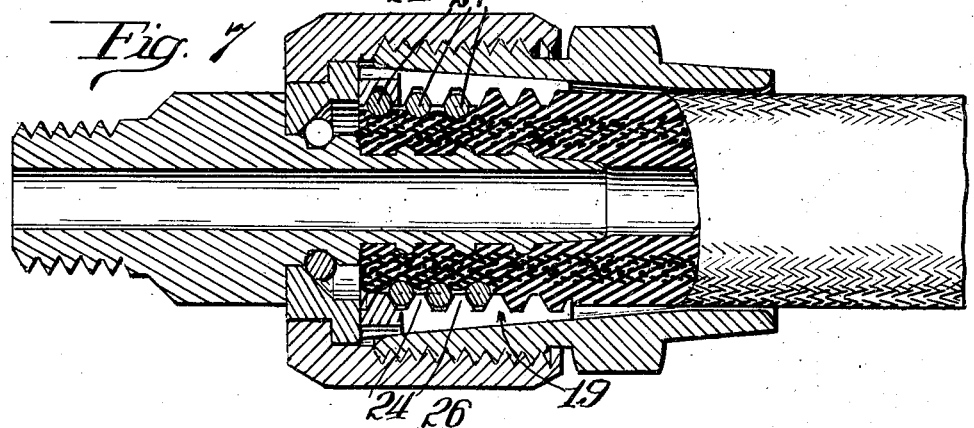
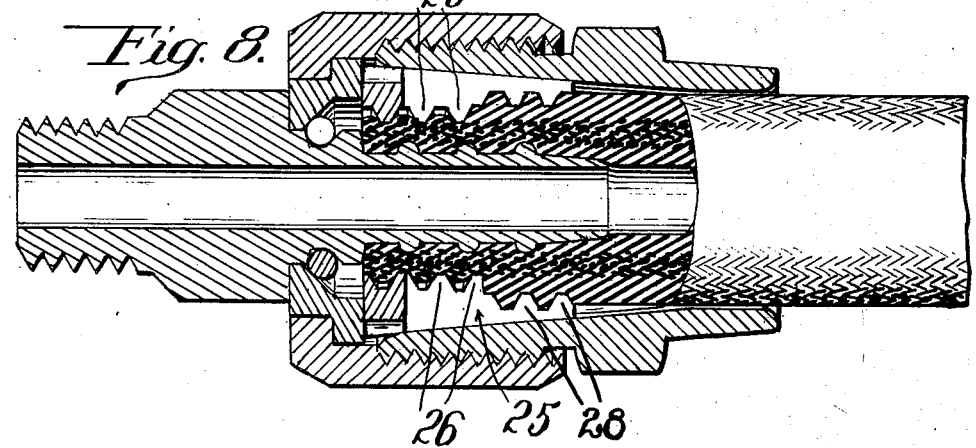

Patented June 14, 1938

2,120,275

UNITED STATES PATENT OFFICE 2,120,275

DETACHABLE HOSE COUPLING

Irving Cowles, Detroit, Mich., assignor to himself and R. W. Lotz, Chicago, Ill., as trustees Application September 16, 1936, Serial No. 101,090

9 Claims. (Cl. 285—86)

The invention has for its main object to provide a detachable hose coupling for high pressure hose of the type equipped with a relatively soft inner tube of rubber, outer jacket of similar material, an intermediate sleeve or sleeves composed of braided wire for effecting reinforcement of the hose to enable it to sustain high fluid pressure, and wherein the coupling means includes a member arranged to engage in the metallic reinforcement of the hose as hereinafter described for preventing the hose end from being forced out or withdrawn from the coupling.

A further object of the invention is to provide a coupling of the type specified which is equipped with a collapsible inner member for engagement with the said metallic reinforcement of the hose end for the purposes specified.

Other objects of the invention will be readily understood from the following specification:

A suitable embodiment of the invention is illustrated in the accompanying drawings, wherein, Fig. 1 is a view partly in central longitudinal section and partly in elevation, showing certain of the coupling members disposed in primary position relatively to a hose end to be engaged in the coupling preparatory to effecting assembly of the coupling with the hose end.

Fig. 2 is a view similar to Fig. 1 showing the coupling parts and hose end disposed in secondary assembled position.

Fig. 3 is a view similar to Fig. 2 showing the coupling and hose end in completely assembled relation.

Figs. 4 and 5 are perspective views of the collapsible member of the coupling.

Fig. 6 is a central longitudinal sectional view showing a slotted sleeve engaged in the outer jacket of a loose end.

Fig. 7 is a view similar to Fig. 3 showing the slotted sleeve of Fig. 6 equipped with a wire helix engaging the reinforcing sleeve of the loose end.

Fig. 8 is a view similar to Fig. 7 showing a modified form of construction.

The coupling comprises a body member I which is hexagonal peripherally between its ends and, in the instance illustrated, is equipped with an externally threaded outer end portion and with an annularly cut away inner end portion terminating at one end in an annular shoulder 3 and at its other end in an annular shoulder 4, both of which are parallel with a vertical plane extending perpendicularly of the axis of the coupling body.

The central stem 5 of the body member is adapted to engage in the inner tube 6 of an end portion of a hose of the type above indicated.

A reduced end portion of the body member, lying between the annular shoulders 3 and 4 thereof, is provided with an annular groove 7 having one wall 8 thereof disposed at an angle of substantially 45 degrees to the longitudinal axis of the coupling and extending angularly downwardly and rearwardly from a point spaced from the annular shoulder 4.

Mounted rotatably upon said reduced end portion of the body member is a collar 9 which abuts at one end against the annular shoulder 3 and which is equipped with an angular annular wall 10 substantially parallel with the wall 8 of the groove 7 for cooperation with said groove to provide an annular recess in which a split ring 11 of wire is disposed, the latter constituting a collar which maintains the outer end portion of the collar 9 in engagement with the said annular shoulder 3 of the body member I.

Said collar 9 is equipped with an annular outwardly projecting flange 12 over which the inner end portion of the bore of the coupling shell 13 is telescopically disposed, said shell 13 being equipped with an inwardly projecting annular flange 14 which fits telescopically over the end portion of the collar 9 lying between the flange 12 and the outer extremity of said collar, said shell being thus rotatably engaged with said collar 9, but held against longitudinal movement relatively to the latter in one direction. Said shell 13 is internally threaded, as shown, for engagement with the external threads 15 of one end portion of a sleeve 16 which is provided between its ends with an externally hexagonal annular flange 17.

The said sleeve 16 is provided with a central bore which is cylindrical or substantially cylindrical from its outer end portion to a point contiguous to the edge of the flange 17 opposed to the threads 15 thereof and from this point to the inner end of said sleeve 16, said bore is tapered as shown and is also equipped with a flaring mouth 18.

Disposed within the coupling shell 13 is a collapsible split sleeve 19 which is equipped with two sets of equal longitudinal slots 20 and 21, respectively, disposed in staggered relation to each other and spaced equi-distantly from each other, each of the slots 20 extending from the inner extremity of the sleeve 19, which is the portion of largest diameter thereof, to a point contiguous to the other end of said sleeve, whereas, said slots 21 extend from the outer extremity of the sleeve 19 to points contiguous to the inner extremity thereof.

The said sleeve 19 is of truncated cone shape, but of relatively slight taper, said taper corresponding substantially with the taper of the last-mentioned bore portion of the sleeve 16. Said sleeve 19 is thus composed of a plurality of substantially equal arcuate sections or segments which, preferably, are equipped with parallel side walls, or in other words, the slots 20 and 21 of said sleeve may be defined as having parallel walls. Each of said arcuate sections or segments of said sleeve is joined with the next adjacent section or segment thereof by the integral connecting elements 22 each of which is appreciably thinner and weaker than the portions of the segments of the sleeve joined thereby. Preferably, the outer face of each of said connecting portions 22 is concave so that it is thinnest midway between its points of junction with said segments of the sleeve.

The sleeve segments are equipped with formations or teeth 23 extending substantially transversely thereof, but which, preferably, define an interrupted thread formation extending from end to end of the sleeve, said thread formation being employed preferably, for the reason that the said sleeve is most cheaply produced by die casting and said thread formations permit of ready withdrawal of the sleeve from the core member of the mold in which the same is cast. The thread formation is also advantageous in that in the event that the sleeve shall be required to be disposed over a cylindrical sleeve of slightly larger outer diameter than the inner diameter of the crown of said thread formation, the latter will permit said sleeve to be easily threaded upon said sleeve, it being obvious that said sleeve is slightly flexible and, therefore, will accommodate such slightly larger cylindrical element.

It will also be noted that the crowns of the inner thread formations of the sleeve 19 are disposed normally in an imaginary cylindrical surface.

The hose end 24, shown in Figs. 1, 2 and 3, and more particularly as shown in Fig. 1, has its outer jacket cut away or skived off, as it is commonly called in the art, down to the outer reinforcing sleeve for a distance slightly greater than the length of the sleeve 19, said skived end portion terminating at one end in the annular shoulder against which the outer or smaller diameter end portion of the sleeve 19 is abutted in the primary step of assembly of the hose and with the coupling member, as shown in Fig. 1. The next step in the assembly consists in inserting the stem 5 into the inner tube 6 of the hose and thereby effecting expansion and appreciable shortening of the skived end portion of the hose end, as more particularly shown in Fig. 2. Following insertion of the stem into the hose as shown in Fig. 2, the nut 13 is disposed over the said collar 9 and is engaged along its threads with the larger diameter extremity of the sleeve 16. The inner and larger diameter extremity of the sleeve 19 abuts against the opposed face of the collar 9 which constitutes a stop formation for the same.

The completion of the assembly of the coupling with the hose end is effected by holding the body member 1 and the sleeve 16 against rotation and then rotating the coupling shell or nut 13 in the direction to draw the sleeve 16 toward the collar 9 until it has attained substantially the position shown in Fig. 3.

During this relative movement of the sleeve 13 and the body portion 1, the sleeve 19 will be collapsed by the bending or breaking of the segment joining portions 22 thereof, which, upon bending or breaking, will project inwardly into engagement with the outer reinforcing sleeve of the skived end portion of the hose. During the said relative movement of the body member 1 and the sleeve 13, the said sleeve 19 is reduced or contracted circumferentially, thus causing the component sections or segments thereof to approach each other as their radial distances from the axis of the sleeve decrease. This contraction is, of course, the force that effects distortion or breakage of the parts 22 of the sleeve as hereinbefore indicated, and also causes the thread formations, or equivalents, of said sleeve 19 to become partially embedded in the reinforcing sleeve or sleeves of the skived end portion of the hose end 24, by effecting distortion of said reinforcing sleeve or sleeves. Obviously, the contraction of the sleeve 19 also effects a severe compression of the inner tube of the hose end 24 against the said stem 5 and thus provides a fluid tight joint between the coupling and the hose end which is capable of withstanding very high fluid pressure.

By holding the sleeve 16 and body member against relative rotation during rotation of the coupling shell or nut 13 to attain the position shown in Fig. 3 the said sleeve 16 will not tend to rotate the sleeve 19 or any of its component segments, thus preventing them from crowding together and becoming grouped into closer relation along one arcuate portion of the circumference of the skived hose end spaced farther apart along another portion thereof which would render the completed structure incapable of withstanding the desired high fluid pressure which a uniform distribution of said segments assures.

The compression of the inner tube of the hose and the distortion of the reinforcing sleeve or sleeves thereof, effects some elongation of the skived end portion of the hose and crowds its extremity against the annular shoulder of the stem 5.

In the event that the hose of which the end portion 24 forms a part, shall burst or wear away under condition of use, to the point where replacement is required, the coupling may be readily dis-assembled, the original sleeve 19 thereof discarded and a new sleeve 19 substituted for the latter.

By reference to Fig. 3 it will be seen that in the event that any force is applied to the hose which tends to withdraw the same from the coupling, the engagement of the teeth of the split sleeve with the reinforcing structure of the hose will cause said sleeve to move responsively to pull on the hose and become further contracted. Thus the force exerted on the hose by said pull is neutralized by the resulting greater contraction of said sleeve.

As shown in Fig. 6, the slotted sleeve 19 may be caused to engage in the outer jacket of the hose end in instances of relatively low pressure installations. For such uses it is preferable to make all component parts of the coupling thinner than those shown in Figs. 1 to 5 inclusive.

In Fig. 7, the sleeve 19 is illustrated as equipped internally with a wire helix 27 engaged in the threads of one end portion thereof. Said helix 27 constitutes a diameter reducing flexible filler for any selected portion of the length of said sleeve and enables the latter to be employed for high pressure installations in connection with skived end portions of reinforced hose to produce substantially the same result as is produced by the structure of Figs. 1 to 3 inclusive in that the said helix 27 is caused to bite into the reinforcing sleeve of the hose end as said sleeve 19 is contracted. The said helix 27 may be made of wires of a relatively wide range of gauges, interchangeable with each other, to fill all of the initial free space between the exposed surface of the reinforcing sleeve of the hose and the inner edges of the thread formations or teeth of the sleeve 19.

In the structure of Fig. 8 the slotted sleeve 25 is of smaller inner diameter at its thicker than at its thinner end portion, the threads or teeth 26 thereof being adapted to bite into an exposed surface portion of the reinforcing sleeve of the hose and the remaining teeth 28 being adapted to bite into the outer jacket of the hose.

I claim as my invention:

1. In a hose coupling of the type specified, an externally tapered sleeve equipped with slots each extending longitudinally from one end thereof to a point adjacent to its other end, alternate slots extending from respectively opposite ends of said sleeve, the portions of the latter aligned with said slots being appreciably thinner and weaker than the next adjacent portions thereof for promoting ready contraction of the said sleeve for the purpose specified.

2. In a hose coupling of the type specified, an externally tapered sleeve equipped with slots each having parallel side walls and extending longitudinally from one end thereof to a point adjacent to its other end, alternate slots extending from respectively opposite ends of said sleeve, the portions of the latter aligned with said slots being appreciably thinner and weaker than the next adjacent portions thereof for promoting ready contraction of the said sleeve for the purpose specified and preventing relative movements of the opposite end portions of sections of said sleeve defined by said slots circumferentially of a member upon which said sleeve is contracted and means for effecting contraction of said sleeve.

3. In a hose coupling of the type specified, an externally tapered sleeve equipped with slots each extending longitudinally from one end thereof to a point adjacent to its other end, alternate slots extending from respectively opposite ends of said sleeve, the portions of the latter aligned with said slots being appreciably thinner and weaker than the next adjacent portions thereof for promoting ready contraction of the said sleeve for the purpose specified, the respective sections of said sleeve defined by said slots being equipped with inwardly extending projections extending laterally of said slots, an internally tapered externally threaded sleeve movable over said slotted sleeve for effecting contraction thereof, and a nut engaged with said threaded sleeve and rotatably engaged with the coupling body for moving said threaded sleeve in the direction requisite to effecting contraction of said slotted sleeve.

4. A hose coupling structure of the type specified including a contractible longitudinally slotted externally tapered and internally threaded sleeve, a wire helix engaged in the internal threads of said sleeve throughout a selected portion of the length of said sleeve, and interengaged members associated with said sleeve for effecting contraction thereof.

5. A hose coupling structure of the type specified including an externally tapered longitudinally slotted sleeve presenting internal surfaces concentric with the axis of said sleeve and of respectively different diameters along opposite end portions of said sleeve, the said internal surfaces being of least diameter along the thicker and of greatest diameter along the thinner end portions of said sleeve, respectively, and means associated with said sleeve for effecting contraction thereof.

6. A hose coupling structure of the type specified including an externally tapered longitudinally slotted sleeve presenting internal surfaces concentric with the axis of said sleeve and of respectively different diameters along opposite end portions of said sleeve, the said internal surfaces being of least diameter along the thicker and of greater diameter along the thinner end portion of said sleeve, respectively, and means associated with said sleeve for effecting contraction thereof, said respective end portions of said sleeve equipped internally with projections adapted to bite into and engage a hose end portion disposed within said sleeve.

7. A hose coupling of the type specified including a body member equipped with a central stem at one end, there being an annular groove in said stem adjacent to and spaced from its point of junction with said body member, a collar of larger diameter than said body member mounted rotatably upon said stem between said groove and said body member, a key-member mounted in said groove and engaged with said collar for preventing removal thereof from said stem, a nut equipped at one end with an inwardly projecting annular flange disposed over said collar with its said flange engaged with the latter, a sleeve having threaded engagement with said nut with its inner end opposed to said collar, and a contractible hose-engaging sleeve disposed within said first-named sleeve with one end abutting said collar, said sleeve equipped with cooperating interengaged surfaces for effecting contraction of the last-mentioned sleeve upon rotation of said nut relatively to said first-named sleeve in one direction.

8. A hose coupling of the type specified including a body member equipped with a central stem at one end and with an annular shoulder bordering the inner end of said stem, there being an annular groove in said stem adjacent to and spaced from its point of junction with said body member, a collar of larger diameter than said body member mounted rotatably upon said stem and abutting said shoulder and in part overhanging said groove, a key-member trapped in said groove and engaged with said collar for locking the latter in place, a nut equipped at one end with an inwardly projecting annular flange disposed over said collar with its said flange engaged with the latter, a sleeve having threaded engagement with said nut with its inner end opposed to said collar, and a contractible hose-engaging sleeve disposed within said first-named sleeve with one end abutting said collar, said sleeve equipped with cooperating interengaged surfaces for effecting contraction of the last-mentioned sleeve upon rotation of said nut relatively to said first-named sleeve in one direction.

9. A hose coupling comprising a body member, a stem rigid therewith, an internally threaded nut rotatably engaged with said body member, an externally threaded internally tapered sleeve engaged with said nut for longitudinal movement relatively to the body member by rotation of said nut and an externally tapered contractible sleeve disposed within said first-named sleeve and provided with two sets of longitudinal slots disposed in staggered relation to each other and each set extending from opposite ends of said second sleeve to points adjacent the other end thereof, there being a longitudinal recess aligned with the closed end of each slot and extending from the latter to the extremity of the sleeves, and a wire helix engaged in the threads of the slotted sleeve for contraction simultaneously with the latter by rotation of said nut in one direction.

IRVING COWLES.